A. NAUMANN.
TOURING SKATE.
APPLICATION FILED JUNE 6, 1911.
1,017,162.
Patented Feb. 13, 1912.
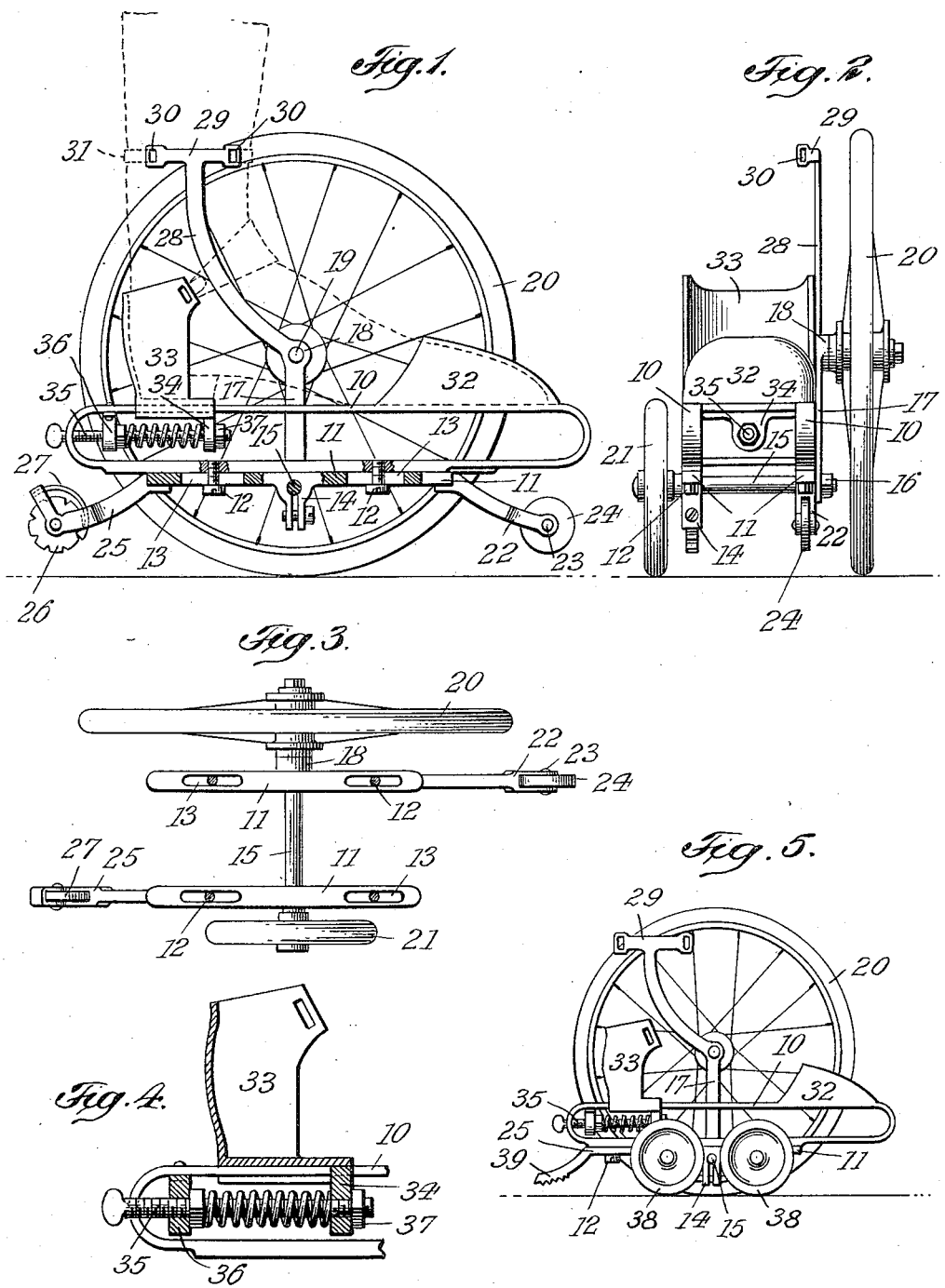

UNITED STATES PATENT OFFICE.

ALFRED NAUMANN, OF NEW YORK, N. Y.

TOURING-SKATE.

1,017,162.  Specification of Letters Patent.  Patented Feb. 13, 1912.

Application filed June 6, 1911.  Serial No. 631,519.

*To all whom it may concern:*

Be it known that I, ALFRED NAUMANN, a citizen of the United States, residing at New York city, Brooklyn, county of Kings, and State of New York, have invented a new and Improved Touring-Skate, of which the following is a specification.

This invention relates to a touring skate of novel construction, which enables the wearer to cover long distances in quick time and with a small expenditure of energy.

In the accompanying drawing: Figure 1 is a longitudinal section of a touring skate embodying my invention; Fig. 2 a front view; Fig. 3 a plan of the running gear; Fig. 4 a detail of the heel cap adjusting means, and, Fig. 5 a side view of a modification of the skate.

The skate comprises essentially a bipartite frame composed of a pair of oblong sections 10, which are suitably united and constitute a foot rest. The latter is mounted on a pair of flat parallel bars 11, to which it is secured by means of screws 12 passing through corresponding slots 13 of the bars, so that the foot rest may be adjusted backward or forward on the bars. Bars 11 are provided with split bearings 14 that accommodate a non-rotatable axle 15, to one end of which is secured by nut 16 an upwardly extending arm 17. This arm is provided at a distance above the foot rest with a bearing 18 for the axle 19 of a comparatively large wheel 20 located at the outer side of the frame and projecting a considerable distance above the foot rest. The other end of axle 15 carries a comparatively small wheel 21 which is thus hung below the frame and is located at the inner side thereof. While the larger outer side wheel 20 constitutes the propelling means proper, the inner side wheel 21 constitutes a balancing device for the foot, its size being such as not to interfere with the free lateral deflection of the leg.

In order to prevent the skater from tilting forward, there is secured to the forward end of one of the bars 11, a forked arm 22 in which is hung the shaft 23 of a small lead wheel 24, said wheel extending forwardly beyond the tread of wheels 20, 21 and being normally raised off the ground. When however the skater wishes to obtain a more restive support, he tilts his foot slightly forward to lower wheel 24 into contact with the ground.

To the rear end of the second bar 11 is secured a forked arm 25 in which is hung the shaft of a brake wheel or trailer 26 shown to be made in the form of a ratchet wheel and engaged by a spring detent 27. Wheel 26 extends rearwardly beyond the tread of wheels 20, 21 and is also normally raised off the ground. Whenever the skater desires to check his movements he tilts his foot slightly backward, so as to lower wheel 26 against the road bed.

It will be seen that the foot rest constitutes a support that is fixed relatively to both wheel axles and is maintained in a substantially horizontal position during propulsion. In use the skater may quickly propel himself forward upon a single pair of wheels arranged side by side and turning with a minimum amount of friction. At the same time he is fully protected against plunging forward and moreover by swinging his foot down at the heel, he can control his speed with great ease and accuracy.

Arm 17 is provided above bearing 18 with an upwardly extending rearwardly curved section 28 having an upper cross bar 29. Through eyes 30 of this cross bar, passes a strap 31 adapted to be tightened up around the ankle. The forward end of frame 10 carries a toe cap 32, while the rear end of said frame carries an adjustable heel cap 33 adapted to be set to the size of the foot. Cap 33 is slidable on frame 10, and provided between the frame sections with a depending apertured lug 34. This lug is loosely engaged by a spring-influenced screw 35 tapped in a fixed bracket 36 and carrying a nut 37. Thus by turning screw 35, the heel cap 33 may be advanced or retracted to change the size of the skate.

In Fig. 5, the single inner balancing wheel 21 is replaced by a pair of small inner wheels 38, the axles of which are arranged slightly backward and forward of the axle 15. Furthermore the rear brake wheel 26 is replaced by a brake shoe 39 integral with rearwardly projecting arm 25. In all other respects the construction is the same as that illustrated in the other figures.

I claim:

1. A touring skate provided with a frame having a fixed foot rest, and a pair of freely rotatable traction wheels of unequal size mounted on opposite sides thereof, the larger wheel being journaled above the foot rest, while the smaller wheel is journaled below said foot rest.

2. A touring skate provided with a foot rest, a pair of parallel bars adjustably connected thereto, a pair of traction wheels of unequal size rotatably secured to said bars on opposite sides thereof, a lead wheel rotatably secured to the forward end of one of said bars, and a trailer rotatably secured to the rear end of the other bar.

ALFRED NAUMANN.

Witnesses:
FRANK V. BRIESEN,
KATHERYNE KOCH.

Copies of this patent may be obtained for five cents each, by addressing the "Commissioner of Patents, Washington, D. C."